US007051951B2

(12) United States Patent
Magi et al.

(10) Patent No.: US 7,051,951 B2
(45) Date of Patent: May 30, 2006

(54) SPRINKLER SYSTEM CONTROL DEVICE

(75) Inventors: Edward James Magi, Hypoluxo, FL (US); James P. Crehan, Palm Beach Gardens, FL (US)

(73) Assignee: The Extra Mile Inc., Hypoluxo, FL (US)

( * ) Notice: Subject to any disclaimer, the term of this patent is extended or adjusted under 35 U.S.C. 154(b) by 77 days.

(21) Appl. No.: 10/704,759

(22) Filed: Nov. 12, 2003

(65) Prior Publication Data

US 2005/0098662 A1 May 12, 2005

(51) Int. Cl.
*A01G 25/06* (2006.01)

(52) U.S. Cl. ...................................... 239/201; 239/571

(58) Field of Classification Search ................ 239/201, 239/570, 572; 137/71, 498, 519.5, 460
See application file for complete search history.

(56) References Cited

U.S. PATENT DOCUMENTS

| | | | | |
|---|---|---|---|---|
| 1,786,963 | A | 12/1930 | Schoenberger | |
| 2,555,627 | A | 6/1951 | Baker | |
| 2,735,498 | A | 2/1956 | Muse | |
| RE24,659 | E | 6/1959 | Clark, Jr. | |
| 3,766,940 | A | 10/1973 | Mason | |
| 4,072,271 | A | 2/1978 | Voss et al. | |
| 4,562,962 | A | 1/1986 | Hartman | |
| 4,825,897 | A | 5/1989 | Shade | |
| 4,842,198 | A | 6/1989 | Chang | |
| 4,944,327 | A | 7/1990 | Gyben | |
| 5,372,306 | A | 12/1994 | Yianilos | |
| 6,178,982 | B1 | 1/2001 | Longstretch | |
| 6,260,575 | B1 * | 7/2001 | Brown et al. | 137/519.5 |
| 6,263,912 | B1 | 7/2001 | Brown et al. | |
| 2002/0088878 | A1 | 7/2002 | Sirkin | |

* cited by examiner

*Primary Examiner*—Christopher Kim
(74) *Attorney, Agent, or Firm*—Welsh & Flaxman LLC

(57) ABSTRACT

A sprinkler system including at least one sprinkler head and a source of supply water having a control device located in a fluid flow line between the source of supply water and each sprinkler head for automatically shutting off the flow of supply water through the sprinkler head in response to a predetermined increase in force of fluid flow. The control device includes a housing having an interior flow path with an upstream opening and a downstream opening. The control device includes a ball valve assembly in the housing. The ball valve assembly includes a valve seat at the downstream opening and a cooperating compressible valve ball which is seated in the valve seat when actuated. During normal operation the ball is located at the upstream end of the housing behind an adjustable ball stop assembly formed by a series of fixed and adjustable stops which form an adjustable size opening. When a predetermined fluid flow force is experienced such as when a sprinkler head is broken or removed, the force of the increased fluid flow will compress the ball allowing it to pass through the ball stop assembly opening and engage the valve seat at the downstream end preventing fluid flow to the sprinkler heads.

16 Claims, 4 Drawing Sheets

SPRINKLER SYSTEM CONTROL DEVICE

BACKGROUND OF THE INVENTION

1. Field of the Invention

The present invention relates to fluid flow systems and more particularly to lawn type sprinkler systems having an automatic control device to shut-off a sprinkler head in the event of a malfunction.

2. Description of the Prior Art

Lawn and grass areas are typically irrigated by in-ground sprinklers, which mayor may not pop-up when water flows from a supply source. Most systems are automatically operated either by a timer or by some type of ground moisture sensing arrangement.

Conventional sprinkler heads are prone to breakage for a variety of reasons. For example, sprinkler heads may be run over by lawn mowers or be stepped on by a person walking across the lawn.

Breaking one or more of the sprinkler heads results in the majority of the water in the system being disbursed through the broken heads, instead of all of the heads as programed. This is not only a waste of water, but can be quite expensive in areas where water shortages are common. Water is a precious commodity in many areas, such as desert developments and the like. In addition, the area around the broken sprinkler head can be damaged by the excessive water flow to this area. With automated systems, breakage of a sprinkler head is often not detected until extensive damage occurs. Moreover, the entire system may be shut down until appropriate repair can be made, thus causing other areas which need the water to be damaged.

The prior art has attempted to address these problems. Various examples of prior attempts are listed below.

U.S. Pat. No. 4,562,962 to Hartman discloses a sprinkling system and valve which closes upon displacement of the sprinkler head using an elongated stem connected to a spring biased valve in the main fluid flow line.

U.S. Pat. No. 5,174,500 to Yianilos discloses a sprinkler system with a valve that closes when a sprinkler head is broken or removed, cutting off the flow of water through the head. A bifurcated actuator is connected to a valve head within the riser and is maintained in place when the head is connected. Removal of the head allows the valve to move upwardly by water pressure to close the fluid flow opening between the head and riser.

U.S. Pat. No. 5,335,857 to Hagon shows a flood prevention device for a sprinkler head using a first pipe slidable within a second pipe and a stopper that operates under fluid pressure to seal a removed head.

U.S. Pat. No. 6,499,678 to Hope shows a shut-off mechanism for a sprinkler system having a built-in shut-off valve permitting removal and/or replacement of the head.

U.S. Pat. No. 6,263,912 to Brown et al discloses a fluid flow control valve using a ball valve for stopping the flow of water when abnormal conditions are sensed. The structure includes fingers which deflect for controlling the movement of the ball to a closure position.

U.S. Pat. No. 4,842,198 to Chang, U.S. Pat. No. 5,372,306 to Yianlos and U.S. Pat. No. 6,178,982 to Longstreth disclose other sprinkler systems wherein a valve is closed upon sensing a broken sprinkler head.

As shown above, the prior art has addressed this problem, but a satisfactory and cost effective means of solving this problem is still needed. The present invention provides a sprinkler system overcoming the shortcomings of the prior art.

SUMMARY OF THE INVENTION

The present invention is an improvement in the art of sprinkler systems with automatic shut-down capabilities that activate when a sprinkler head is broken or removed from the fluid line. A control device is connected in the sprinkler head riser line between the sprinkler head and the supply line. The control device uses a ball valve that activates to shut off the water to the head in the event of greatly increased fluid flow, such as would occur when the sprinkler head is broken or removed. The ball valve includes a valve seat at the downstream end of the control device. The ball valve also includes a compressible, resilient, ball positioned at the upstream end of the control device. Movement of the ball is controlled by of a series of stops, at least one of which is adjustable to regulate the force required to allow the ball to be forced past the stops to engage the ball valve seat and thus close the valve. When increased flow occurs, rather than a change in pressure, the compressible, resilient ball is forced past the stop structure until it engages the ball valve seat at the downstream end of the control device to shut off water flow to the sprinkler head.

A control device for a fluid flow line automatically shuts off fluid flow in response to a predetermined increase in force of fluid flow. The control device has a housing having an interior flow path including an upstream opening and a downstream opening. The control device further includes a valve seat located at the downstream opening in the flow path and an adjustable ball stop assembly located in the housing spaced between the upstream and downstream openings. The adjustable ball stop assembly includes an adjustable size opening and a compressible ball located in the interior flow path in the housing. During normal operation the ball is positioned behind the adjustable ball stop assembly at the upstream end. A predetermined fluid flow force will cause the ball to be compressed, allowing the ball to pass through the opening in the adjustable ball stop assembly and engage the valve seat at the downstream end stopping fluid flow through the control device.

Among the objects of the present invention is the provision of a sprinkler system that automatically closes off an individual sprinkler head when the head is removed or broken.

Another object of the present invention is the provision of an improved sprinkler head assembly that is adjustable to control the amount of fluid flow required to close off an individual sprinkler head in the event of sprinkler head failure.

Still another object of the present invention is the provision of an automatic sprinkler system that senses increased fluid flow as a measure of the volume of fluid entrained on the sensing device to control operation thereof. This device senses fluid flow changes rather than changes in pressure.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
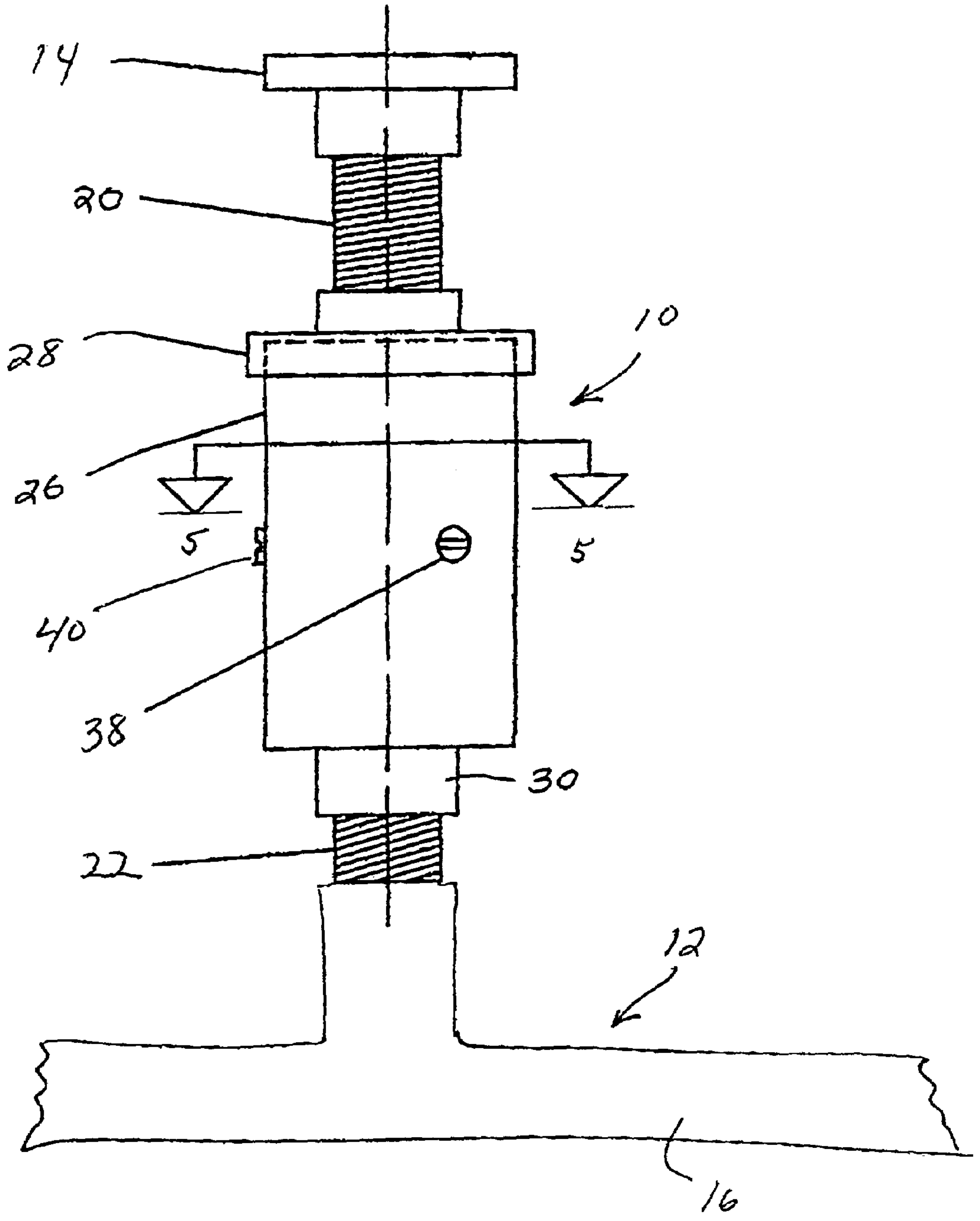
FIG. 1 is an elevational view of a sprinkler system control device in accordance with the present invention.
Figure 2:
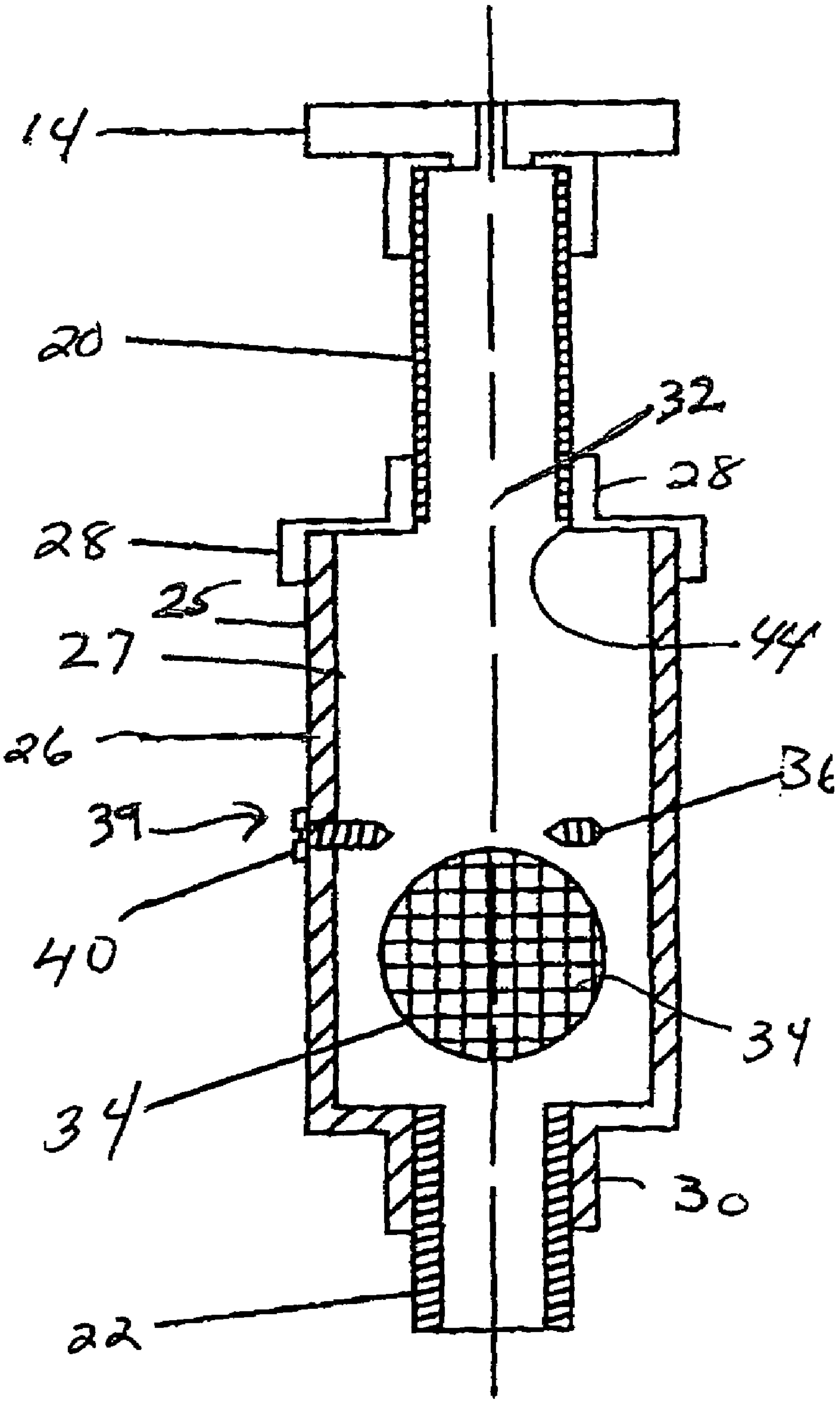
FIG. 2 is a sectional view taken along the lines 2—2 of FIG. 5 with a sprinkler head in a normal operational position.
Figure 3:
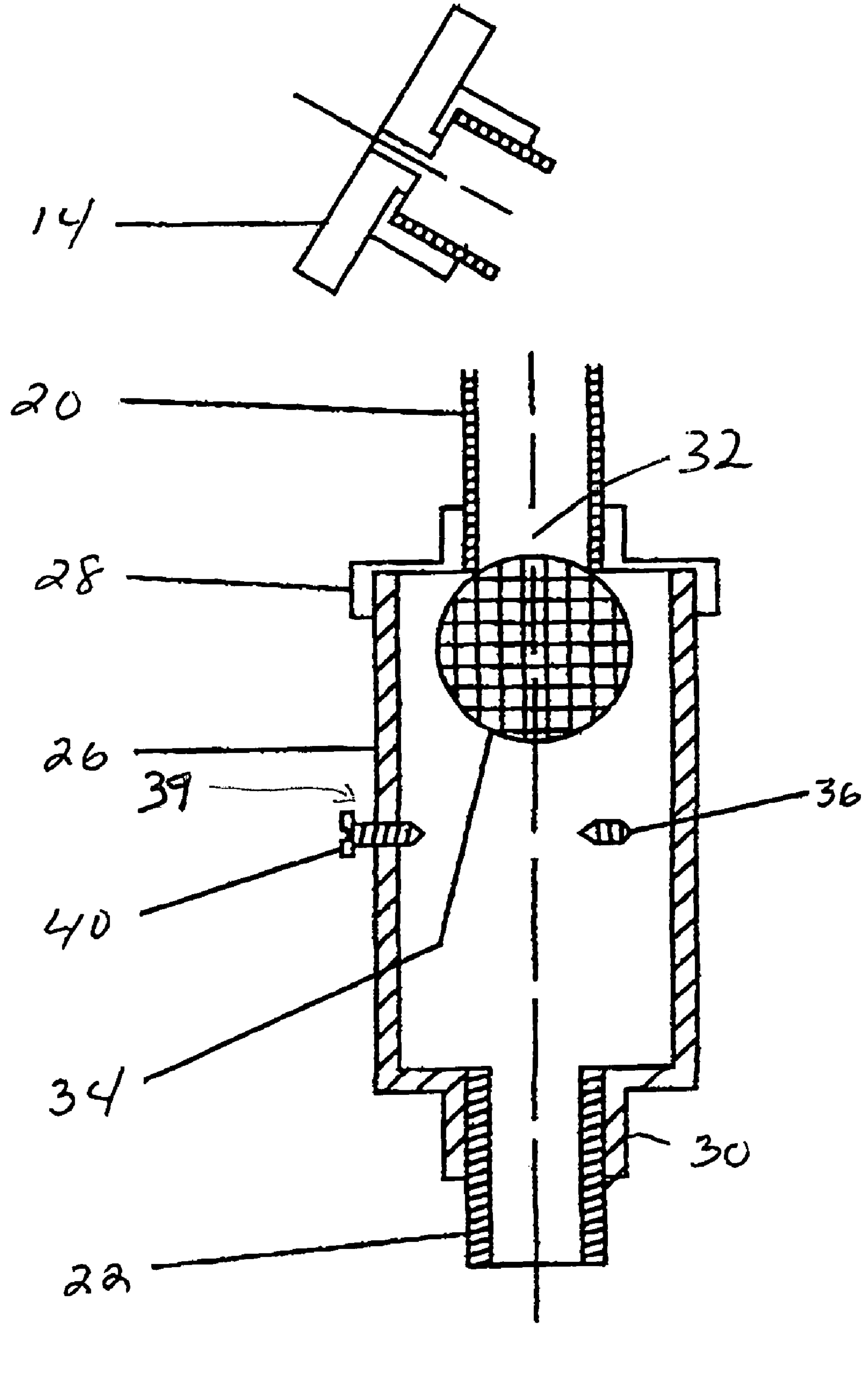
FIG. 3 is the sectional view of FIG. 2 with the sprinkler head detached.
Figure 4:
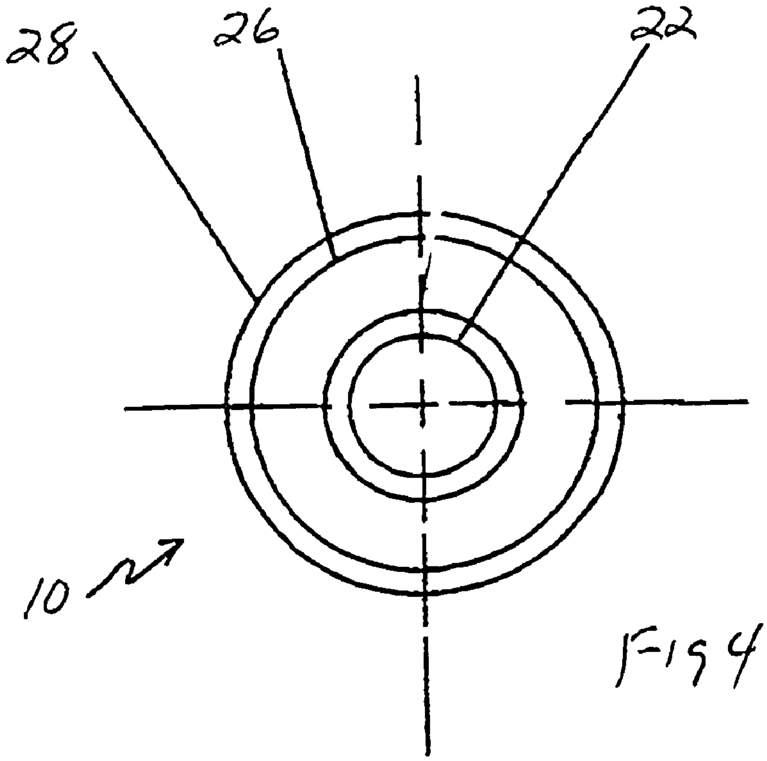
FIG. 4 is a bottom view of the device of FIG. 1.
Figure 5:
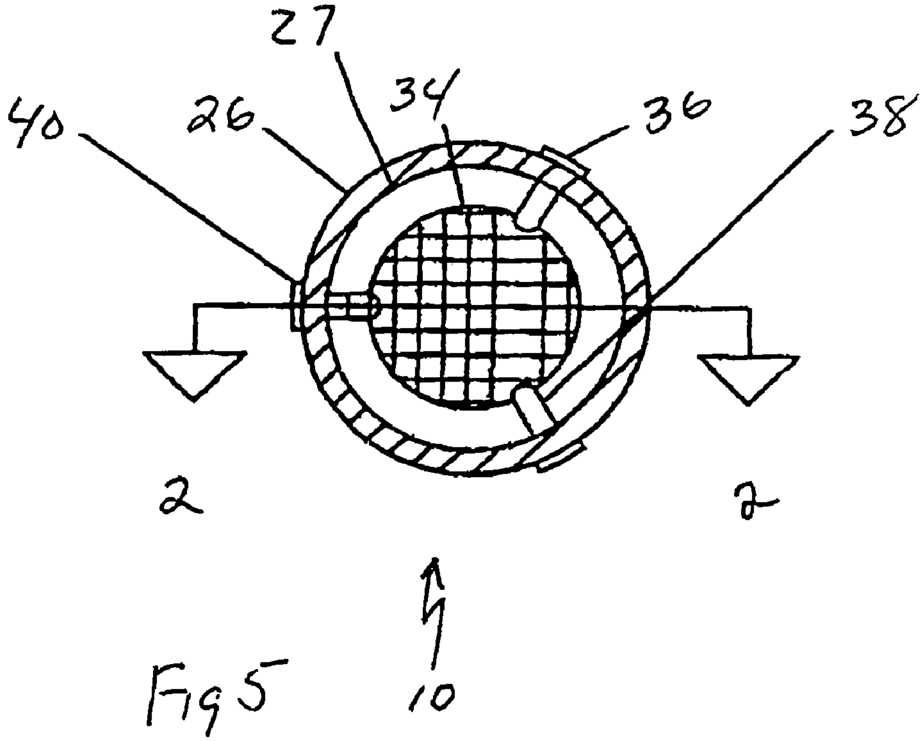
FIG. 5 is a sectional view taken along the lines 5—5 of FIG. 1.

FIGS. 1 to 5 illustrate a control device 10 used in a lawn type sprinkler system 12. The control device 10 provides an automatic shut-off function in the event a sprinkler head 14 is broken or removed. As illustrated in FIG. 1, the system 12 includes a supply line 16 that supplies water to a plurality of sprinkler heads 14, only one sprinkler head being shown. Each sprinkler head 14 is attached to a threaded upper riser pipe 20 or similar connecting means. In accordance with a preferred embodiment of the present invention, the sprinkler head 14 will generally be made from plastic, but other materials such as various metals are suitable. A second, threaded, lower riser pipe 22 is connected to the water supply line 16 which, in turn, is connected to a suitable water supply using conventional valves and control system to control water flow.

The control device 10 is preferably connected between the upper riser pipe 20 and the lower riser pipe 22 so as to be located upstream of and beneath the sprinkler head 14. The control device 10 is generally located under the ground surface and in-line with the water supply flowing through the lower riser pipe 22 to the upper riser pipe 20. In accordance with a preferred embodiment of the present invention, the upper and lower riser pipes 20, 22 are generally metal, however, numerous suitable plastic materials could be used in staying within the spirit of the invention.

The control device 10 includes a cylindrical housing 26 and a removable cap 28 at one end thereof that allows access to the interior of the housing 26. In accordance with a preferred embodiment of the present invention, the control device 10 and the cap 28 can be made from various materials, such as plastic and metals, although plastics are preferred. The opposite end of the cylindrical housing 26 includes an extension 30 for connection to the lower riser 22. Located within the cylindrical housing 26 is a compressible ball 34 and a ball stop assembly 39 formed by a pair of fixed stop members 36, 38 and an adjustable stop member 40. The stop members 36, 38, 40 are located in the same plane and spaced about the interior wall 27 of housing 26 at 120 degree intervals. The stop members 36, 38, 40 can be made from various materials, such as, plastics and metals, although plastics are preferred.

The cap 28 includes an annular opening 32 and, at the downstream end thereof, a valve seat 44 that cooperates with the compressible ball 34 to shut off water flow to the sprinkler head 14. The compressible ball 34 is positioned within the interior of the housing 26 and is freely moveable therein at the upstream end of the housing 26 behind the ball stop assembly 39. The size and type of the compressible ball 34 is determined by the size of the interior circumference of the housing 26 and distance the fixed stop members 36, 38 and the adjustable stop member 40 extend from one another. Preferably, the fixed stop members 36, 38 are permanently attached to the housing 26 and extend a predetermined distance within the interior of the housing 26.

The adjustable stop member 40 is a screw type device threaded into an aperture in the housing side wall from exterior 25 to interior 27. The distance adjustable stop member 40 extends within the interior of the housing 26 is adjustable by merely turning the stop member. Thus, the adjustable stop member 40 can change the size of the opening formed by all of the stop members 36, 38, 40. The further into the housing 26 the adjustable stop member 40 extends, the larger the fluid flow force will need to be in order to compress and push the compressible ball 34 past the ball stop assembly 39 and into contact with the valve seat 44 as the size of the opening formed by the ends of the stop members 36, 38, 40 has been decreased. In accordance with a preferred embodiment of the present invention, the compressible ball 34 is made from rubber, however, any suitable material which compresses and seats within valve seat 44 could be used.

It will be appreciated that the compressible ball 34 is designed to be maintained in the upstream location during normal operation of the sprinkler system 12 such that water flows around it and to the upper riser pipe 20. As can be seen from the sectional view, there is sufficient space in the control device 10 to allow a sufficient amount of water flow to travel around the compressible ball 34 when located on the upstream side of the ball stop assembly 39 to operate the sprinkler heads 14 in a normal manner.

It should be noted that if the space between the compressible ball 34 and the interior wall 27 is too large the control device 10 will not operate properly. That is, if too much water is permitted to flow between the compressible ball 34 and the interior wall 27 of the housing 26 during normal operation, then there would not be a sufficient change in the force of the fluid flow to force the compressible ball 34 past the stop assembly 39 should a break occur.

During proper operation, should a sprinkler head 14 be removed or broken, the flow of water greatly increases and the flow force of the water will push the compressible ball 34 past the stop members 36, 38, 40 when they are properly adjusted. Once past the stop members 36, 38, 40, the compressible ball 34 seats against the valve seat 44 of the cap 28 and blocks the opening to stop water flow to the upper riser pipe 20 and in turn to the broken or removed sprinkler head 14.

The ball stop assembly 39 is adjusted and set into proper operating position by using a broken sprinkler head connected thereto. Specifically, water is turned on and the adjustable stop member 40 is back screwed to decrease the distance it extends into the interior of housing 26 until the compressible ball 34 is allowed to sufficiently compress so as to pass freely past the ball stop assembly 39 and seats itself against the annular valve seat opening 44 in the cap 28. It then becomes a simple matter to turn the water off, and force the compressible ball 34 back past the ball stop assembly 39 to the upstream position where it is ready to use again after a properly functioning sprinkler head 14 replaces the broken head. The compressible ball 34 can be repositioned to its upstream position behind the ball stop assembly 39 by applying pressure with a suitable tool inserted through the upper riser pipe 20 before the broken head is replaced or the cap 28 can be removed and the compressible ball 34 is pushed down by hand.

If the sprinkler head is broken in the future a similar head is used to replace it and no further adjustments are necessary.

Should a different sprinkler head be used, the force needed to cause the compressible ball 34 to actuate should be readjusted.

It will be appreciated that the control device of the present invention is equally applicable to any type of fluid flow system where automatic shut-off is needed in the event of increased force of fluid flow. Similarly, a ball stop assembly having any number of fixed and adjustable stop members may be used in keeping within the spirit and scope of the present invention as defined by the appended claims.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A control device for a fluid flow line for automatically shutting off fluid flow in response to a predetermined increase in force of fluid flow, comprising:

a housing having an interior flow path including an upstream opening and a downstream opening;

a valve seat located at the downstream opening in the flow path;

an adjustable ball stop assembly located in the housing spaced between the upstream opening and the downstream opening, wherein the adjustable ball stop assembly has an adjustable size opening defined by at least one adjustable stop member extending through the housing from an exterior of the housing to an interior of the housing for adjustment thereof from the exterior of the housing;

a compressible ball located in the interior flow path in the housing and being positioned during normal operation behind the adjustable ball stop assembly at the upstream end; and whereby a predetermined fluid flow force will cause the ball to be compressed to a shape and size allowing the ball to pass through the opening in the adjustable ball stop assembly and engage the valve seat at the downstream end stopping fluid flow through the control device.

2. The control device of claim 1 wherein the adjustable ball stop assembly further includes at least one fixed stop member extending into the interior flow path.

3. The control device of claim 2 wherein the at least one adjustable stop member is in the form of a thread screw which extends through an aperture in the housing to extend into the flow path.

4. The control device of claim 1 wherein the housing is cylindrical in shape.

5. The control device of claim 1 wherein the adjustable ball stop assembly further includes two fixed stop members spaced about the circumference of the housing at intervals to define the opening.

6. The control device of claim 1 wherein the valve seat is formed in a removable cap on the downstream opening end of the housing.

7. The control device of claim 5 wherein the housing is cylindrical in shape.

8. A sprinkler system including at least one sprinkler head and water supply lines, wherein the improvement comprises:

a control device for the sprinkler system located in a fluid flow line between a source of supply water and the at least one sprinkler head for automatically shutting off the flow of supply water to the sprinkler head in response to a predetermined increase in force of fluid flow;

the control device including a housing having an interior flow path including an upstream opening and a downstream opening;

a valve seat located at the downstream opening in the flow path;

an adjustable ball stop assembly located in the housing spaced between the upstream and downstream openings, wherein the adjustable ball stop assembly has an adjustable size opening defined by at least one adjustable stop member extending through the housing from an exterior of the housing to an interior of the housing for adjustment thereof from the exterior of the housing;

a compressible ball located in the interior flow path in the housing and being positioned during normal operation behind the adjustable ball stop assembly at the upstream end; and whereby a predetermined fluid flow force will cause the ball to be compressed to a shape and size allowing the ball to pass through the opening in the adjustable ball stop assembly and engage the valve seat at the downstream end stopping fluid flow through the control device.

9. The sprinkler system of claim 8 wherein the adjustable ball stop assembly further includes at least one fixed stop member extending into the interior flow path.

10. The sprinkler system of claim 8 further including a riser pipe between the at least one sprinkler head and the control device and a riser pipe between the control device and the source of water supply.

11. The sprinkler system of claim 9 wherein the at least one adjustable stop member is in the form of a thread screw which extends through an aperture in the housing to extend into the flow path.

12. The sprinkler system of claim 8 wherein the housing is cylindrical in shape.

13. The sprinkler system of claim 8 wherein the adjustable ball stop assembly further includes two fixed stop members spaced about the circumference of the housing at intervals to define the opening.

14. The sprinkler system of claim 8 wherein the adjustable ball stop assembly includes at least one adjustable stop member extending into the flow path defining the opening.

15. The sprinkler system of claim 13 wherein the housing is cylindrical in shape.

16. A sprinkler system including at least one sprinkler head and fluid supply lines; a control device for an individual sprinkler head fluid flow line for automatically shutting off fluid flow in response to a predetermined increase in force of fluid flow, comprising:

a housing having an interior flow path including an upstream opening and a downstream opening;

a valve seat located at the downstream opening in the flow path;

a ball valve assembly;

a compressible ball located in the interior flow path in the housing and being positioned during normal operation at the upstream end behind and spaced from said valve seat located at the downstream opening;

a stop assembly located in the housing spaced between the upstream opening and the downstream opening for positioning said ball at the upstream opening, wherein the ball stop assembly has an opening smaller than said ball defined by at least one stop member extending through the housing from an exterior of the housing to an interior of the housing for adjustment thereof from the exterior of the housing; and whereby a predetermined fluid flow force will cause the ball to be compressed to a shape and size allowing the ball to pass through the opening in the ball stop assembly moving downstream thereby and engaging the valve seat at the downstream end, stopping fluid flow through the control device.

* * * * *